United States Patent
Beaujot et al.

(10) Patent No.: US 10,104,833 B2
(45) Date of Patent: Oct. 23, 2018

(54) FILLING AIR SEEDER PRODUCT TANKS

(71) Applicant: SEEDMASTER MANUFACTURING LTD., Emerald Park (CA)

(72) Inventors: Norbert Beaujot, Emerald Park (CA); Owen Kinch, Emerald Park (CA); Timothy Ottenbreit, Emerald Park (CA)

(73) Assignee: SeedMaster Manufacturing Ltd., Emerald Park, SK (CA)

( * ) Notice: Subject to any disclaimer, the term of this patent is extended or adjusted under 35 U.S.C. 154(b) by 128 days.

(21) Appl. No.: 15/096,577

(22) Filed: Apr. 12, 2016

(65) Prior Publication Data
US 2016/0304300 A1    Oct. 20, 2016

(30) Foreign Application Priority Data

Apr. 14, 2015   (CA) ...................... 2888014

(51) Int. Cl.
*A01B 79/00* (2006.01)
*B65G 41/00* (2006.01)
(Continued)

(52) U.S. Cl.
CPC .......... *A01C 15/003* (2013.01); *A01B 79/005* (2013.01); *B65G 41/002* (2013.01); *B65G 65/42* (2013.01); *B65G 67/04* (2013.01); *A01C 7/081* (2013.01); *A01C 15/006* (2013.01); *Y02P 60/16* (2015.11); *Y02P 60/23* (2015.11)

(58) Field of Classification Search
CPC .... A01B 79/005; A01B 79/00; B65G 41/002; B65G 41/001; B65G 41/00; B65G 65/42; B65G 65/40; B65G 65/34; B65G 65/30; B65G 65/00; B65G 67/04; B65G 67/02; B65G 67/00; A01C 15/003; A01C 15/00; A01C 7/081; A01C 7/08; A01C 7/00; A01C 15/006; A01C 15/005; Y02F 60/16; Y02F 60/10; Y02F 60/00; Y02F 60/23; Y02F 60/20
See application file for complete search history.

(56) References Cited

U.S. PATENT DOCUMENTS

| | | | |
|---|---|---|---|
| 4,562,968 A | * | 1/1986 | Widmer ................. A01C 15/04 111/175 |
| 5,718,556 A | | 2/1998 | Forsyth |

(Continued)

*Primary Examiner* — Christopher J. Novosad
(74) *Attorney, Agent, or Firm* — Nixon & Vanderhye P.C.

(57) ABSTRACT

A agricultural product transport apparatus has a plurality of containers mounted on a vehicle. A gate on each container controls flows out to a conveyor system that receives product from each container and transfers same to a conveyor discharge located beside the operator's station. The horizontal distance between a front end of the container vehicle and the conveyor discharge is less than the horizontal distance between a rear side of the furrow opener implement and a front fill opening on the product cart, such that the container vehicle can be driven forward behind the air seeder and the conveyor discharge positioned to discharge into the front tank fill opening while the front end of the container vehicle is rearward of the rear side of the implement. A weighing system connected to a controller allows an operator to control and management of product flow from storage to the field.

24 Claims, 3 Drawing Sheets (51) Int. Cl.
*B65G 65/42* (2006.01)
*B65G 67/04* (2006.01)
*A01C 15/00* (2006.01)
*A01C 7/08* (2006.01)

(56) References Cited

U.S. PATENT DOCUMENTS

| | | | |
|---|---|---|---|
| 6,396,003 B1 | 5/2002 | Friesen | |
| 6,591,766 B2 * | 7/2003 | Williames | A01C 11/025 |
| | | | 111/105 |
| 6,893,202 B2 | 5/2005 | Hunt | |
| 7,500,814 B2 | 3/2009 | Meyer | |
| 7,765,944 B2 | 8/2010 | Wilson | |
| 8,020,724 B2 * | 9/2011 | Remis | B65B 5/103 |
| | | | 111/179 |
| 8,573,917 B2 | 11/2013 | Renyer | |
| 8,794,900 B2 | 8/2014 | Friggstad et al. | |
| 8,801,353 B2 | 8/2014 | Friggstad et al. | |
| 8,974,170 B2 | 3/2015 | Ryder et al. | |
| 2002/0043194 A1 * | 4/2002 | Kinzenbaw | A01C 7/04 |
| | | | 111/54 |
| 2004/0148057 A1 * | 7/2004 | Breed | B60Q 9/008 |
| | | | 700/242 |
| 2006/0180062 A1 | 8/2006 | Furrer et al. | |
| 2012/0037058 A1 | 2/2012 | Neufeld et al. | |
| 2012/0275888 A1 | 11/2012 | Claussen et al. | |
| 2013/0134012 A1 | 5/2013 | Borkgren | |
| 2014/0216315 A1 | 8/2014 | Beaujot et al. | |
| 2014/0343723 A1 | 11/2014 | Meier et al. | |

\* cited by examiner

FILLING AIR SEEDER PRODUCT TANKS

This application claims priority to CA Serial No. 2,888,014 filed 14 Apr. 2015, the entire content of which is hereby incorporated by reference.

This disclosure relates to the field of agricultural seeding equipment and in particular a equipment for filling the product tanks of an air seeder.

BACKGROUND

Air seeders are the typical implement used by farmers to seed their fields and apply fertilizer and chemicals in one operation. These air seeders typically comprise a laterally extending furrow opener implement mounted on wheels with a plurality of ground engaging furrow openers mounted on the implement and spaced across the width thereof. Product tanks for carrying various agricultural products such as seed, fertilizer, and chemicals can be mounted on the implement, or commonly on a separate tank cart towed either behind the implement, or between the implement and a tractor pulling the air seeder. Modern air seeders typically have three, four, or even five product tanks to carry the various agricultural products required for a seeding operation. The agricultural products are transferred from the product tanks to the furrow openers by an air stream. Row crop planter type air seeders may have small seed compartments above each furrow opener that are kept filled by an air stream carry product from a product tank.

A typical air seeder is disclosed for example in U.S. Pat. No. 8,974,170 to Ryder et al. Such air seeders are increasing in width in response to the increasing demand from farmers for ways to reduce the time required to seed their crops. Along with the wider implements, the size of the agricultural product tanks has grown as well in order to reduce the need to stop the air seeder and fill the tanks. Typically air seeders include a fill conveyor mounted adjacent to the tanks which is movable from a transport position hanging on the tank cart when the air seeder is operating, to an operating position with an intake end on the ground accessible to the discharge from a transport vehicle and a discharge end oriented to direct conveyed product into fill openings of the various tanks. While in the operating position the fill conveyor must be maneuvered to orient the discharge end into the different fill openings.

Ryder discloses such a fill conveyor, and discloses mounting system to facilitate maneuvering the conveyor from the transport position to the operating position, and from one tank fill opening to another. Considerable effort has been directed at facilitating such movement, as the fill conveyor have also increased in size and weight. See for example U.S. Pat. Nos. 8,794,900 and 8,801,353 to Friggstad et al. and U.S. Pat. No. 7,500,814 to Meyer.

U.S. Pat. No. 8,573,917 to Renyer and United States Patent Application Number 20060180062 of Furrer et al. disclose seed tenders for moving agricultural products from storage to the air seeder. These comprise essentially one or more hoppered containers and a conveyor system for receiving product from each container. The tender is driven alongside the seeding implement and the conveyor discharge can then discharge into seed boxes on conventional drills or can be elevated to discharge directly into fill openings of the air seeder tanks.

Convey-all industries Inc. of Winkler, Manitoba, Canada also makes a trailer with a plurality of containers and a horizontal conveyor running under the container to receive product from each container, and an inclined conveyor at the rear of the trailer to receive the product from the horizontal conveyor and direct same into the fill openings of the air seeder tanks. The trailer is towed by a highway tractor and moved in reverse toward the air seeder tanks. Moving in reverse allows the Convey-all™ seed handling system to fill tanks on tank carts that are towed between the tractor and the laterally extending furrow opener implement.

U.S. Pat. No. 7,765,944 to Wilson discloses a weight sensor for product tanks on seeding implements such as grain drills and air seeder. United States Published Patent Application Number 2014/0216315 of the present inventor Beaujot discloses a weight sensor that weighs individual product tanks. These sensors allow an operator to know the weight of each product carried on the seeder. United States Published Patent Application Number 2014/0343723 of Meier et al. discloses a bin spill prevention system operative to close the discharge gate of a truck that is discharging into a conveyor on receiving an indication that a bin receiving product from the conveyor is full.

SUMMARY OF THE INVENTION

The present disclosure provides a system for filling product tanks on an air seeder that overcomes problems in the prior art.

A typical farmer will decide prior to the seeding season which fields will be seed with which crops along with the various fertilizers that will be applied on each crop. The farmer will know as well the number of acres in each field from global positioning satellite mapping It has become fairly common for farmers to apply seed and fertilizer at rates which vary from field to field, and from one zone to another within any given field. The farmer will know the product application rates to be used on each zone and the size of each zone in each field and will thus know how much of each agricultural product he will require to complete his seeding project.

The farmer will then commonly place the required amounts of each agricultural product to be used into a storage facility, and during the seeding operation will transfer agricultural products as needed from the storage facility to his seeding implement, commonly an air seeder configured to seed conventional solid seeded crops or crops that are seeded in widely spaced rows.

For maximum crop yields farmers usually want to complete seeding in a relatively short period of time and to accomplish this air seeders can be very wide to cover a large acreage in a short time, and to reduce the frequency of stopping to refill, the product tanks that carry the agricultural products are correspondingly large, holding 80-90,000 pounds of three or four different agricultural products. The time required to maneuver transport vehicles and conveyors can be significant each time a filling event occurs, and the present invention can significantly reduce the time required for filling, thereby reducing down time and increasing the number of hours in a day the air seeder is actually seeding the crops.

In a first embodiment the present disclosure provides a transport apparatus for transporting agricultural products to an air seeder, where the air seeder comprises a laterally extending furrow opener implement mounted on wheels for travel in an operating travel direction, and a tank cart towed behind the implement, the tank cart comprising a first tank with a first tank fill opening on a top of the tank cart at a front of the tank cart, and a second tank with a second tank fill opening on the top of the tank cart rearward of the first tank fill opening. The apparatus comprises a plurality of product containers mounted on a container vehicle, each product container configured to release product contained therein through a container output port, and a vehicle operator's station at a forward location on the container vehicle. A gate on each container output port is operative to control flow of the product through the container output port, and a gate control is operative to control each gate. A conveyor system is configured to receive product from each container output port and transfer same to a conveyor discharge, and the conveyor discharge is movable from a discharge transport position to a discharge operating position. When in the discharge operating position the conveyor discharge is located lateral to the operator's station, and a horizontal distance between a front end of the container vehicle and the conveyor discharge is less than a horizontal distance between a rear side of the furrow opener implement and the first fill opening, such that when the furrow opener implement, the tank cart, and the container vehicle are aligned in the operating travel direction, and the conveyor discharge is oriented to discharge into the first tank fill opening, the container vehicle is lateral to the tank cart and the front end of the container vehicle is rearward of the rear side of the implement.

In a second embodiment the present disclosure provides a transport apparatus for transporting agricultural products to an air seeder, where the air seeder comprises a laterally extending furrow opener implement, and a tank cart carrying a plurality of product tanks, each product tank with a tank fill opening on a top of the tank cart. The apparatus comprises a plurality of product containers mounted on a container vehicle, each product container configured to release product contained therein through a container output port. A gate on each container output port is operative to control a flow of product through the container output port, and a gate control is operative to control each gate. A conveyor system is configured to receive product from each container output port and transfer same to a conveyor discharge, and a weighing system is operative to determine a weight of agricultural products in the product containers. A microprocessor controller is connected to the weighing system and is operative to store a weight of the product in each product container and a corresponding indicator of the identity of the product in each product container.

In a third embodiment the present disclosure provides a method of transferring agricultural products from a storage facility to an air seeder, where the air seeder comprises a tank cart comprising first and second product tanks, and a distribution system for transferring first and second products from the corresponding first and second product tanks to a field during a field seeding operation. The method comprises, prior to beginning the field seeding operation, depositing a stored product weight of first and second agricultural products into the storage facility; transferring a quantity of first and second agricultural products from the storage facility to first and second product containers, and moving the product containers to the air seeder; providing a microprocessor controller connected to a weighing system to receive weight information and connected to selectively activate first and second gate actuators; moving the first product container to a discharge position and, with the microprocessor controller, activating the first gate actuator to open a first gate on the first product container such that the first product flows onto a conveyor intake and is transferred by a conveyor system to a conveyor discharge oriented to discharge the first product into the first product tank; with the weighing system, weighing the first product transferred to the first product tank and, with the microprocessor controller, activating the first gate actuator to close the first gate upon the microprocessor controller receiving weight information from the weighing system that a selected weight has been transferred from the first product container to the first product tank, or upon receiving an indication that the first product tank is filled to a full capacity thereof; moving the second product container to the discharge position and, with the microprocessor controller, activating the second gate actuator to open a second gate on the second product container such that the second product flows onto the conveyor intake and is transferred by the conveyor system to the conveyor discharge oriented to discharge the second product into the second product tank; with the weighing system, weighing the second product transferred to the second product tank and, with the microprocessor controller, activating the second gate actuator to close the second gate upon the microprocessor controller receiving weight information from the weighing system that a selected weight has been transferred from the second product container to the second product tank, or upon receiving an indication that the second product tank is filled to a full capacity thereof.

The present disclosure provides information useful to the farmer operator during a seeding operation. The weight of the product tanks can be minimized, reducing compaction and fuel requirements. Time is saved by monitoring and managing product storage, transportation, and use.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic top view of an embodiment of the transport apparatus of the present disclosure in a position to discharge an agricultural product into the tank fill opening of a product tank on the tank cart of an air seeder;

FIG. 2 is a schematic side view of the embodiment of FIG. 1;

FIG. 3 is a schematic top view of the trailer of the embodiment of FIG. 1 with the transfer conveyor thereof shown in a first orientation to transfer agricultural products from the product container on the trailer into product tanks on an air seeder tank cart, and in a second orientation to transfer agricultural products from a storage facility into the product containers on the trailer;

FIG. 4 is a schematic side view of an alternate conveyor support bracket for use with the embodiment of FIG. 1;

FIG. 5 is a schematic top view of the alternate conveyor support bracket of FIG. 4;

FIG. 6 is a schematic illustration of an information display visible to the operator;

FIG. 7 is a schematic side view of an alternate air seeder tank cart with a weighing system operative to determine the amount of product in each product tank.

DETAILED DESCRIPTION OF THE ILLUSTRATED EMBODIMENTS

FIGS. 1 and 2 schematically illustrate an embodiment of a transport apparatus 1 of the present disclosure for transporting agricultural products to an air seeder 3 that comprises a laterally extending furrow opener implement 5 mounted on wheels 7 for travel in an operating travel direction T, and a tank cart 9 towed behind the implement 5.

The tank cart 9 comprises a first tank 11A with a first tank fill opening 13A on a top of the tank cart 9 at a front of the tank cart, and a second tank 11B with a second tank fill opening 13B on the top of the tank cart rearward of the first tank fill opening 13A, and a third tank 11C with a third tank fill opening 13C on the top of the tank cart 9 rearward of the second tank fill opening 13B. A tractor 15 is attached to the front end of the implement 5.

The apparatus 1 comprises a plurality of product containers 17 mounted on a container vehicle, where each product container is configured to release product contained therein through a container output port 19. In the illustrated apparatus the container vehicle comprises a trailer 21 towed by a tractor 23, although the container vehicle could also be a truck or like self-propelled vehicle. A vehicle operator's station 25 is located at a forward location on the container vehicle, here located on the tractor 23. In the illustrated apparatus 1 three product containers 17A, 17B and 17C are mounted on the trailer 21, with corresponding output ports 19A, 19B, 19C.

The product containers 17 are different sizes since in a typical agricultural field seeding operation the application rates of different agricultural products can vary significantly, with typically one product having the highest application rate and so also requiring the largest quantity thereof transported to the air seeder 3, and so is carried in the largest product container, illustrated here as product container 17A.

A gate 27 on each container output port 19 is operative to control flow of the product through the container output port 19, and a gate control 29 is operative to control each gate 27. The illustrated apparatus 1 has gates 27A, 27B, and 27C controlling flow from the corresponding output ports 19A, 19B, 19C.

Figure 1:
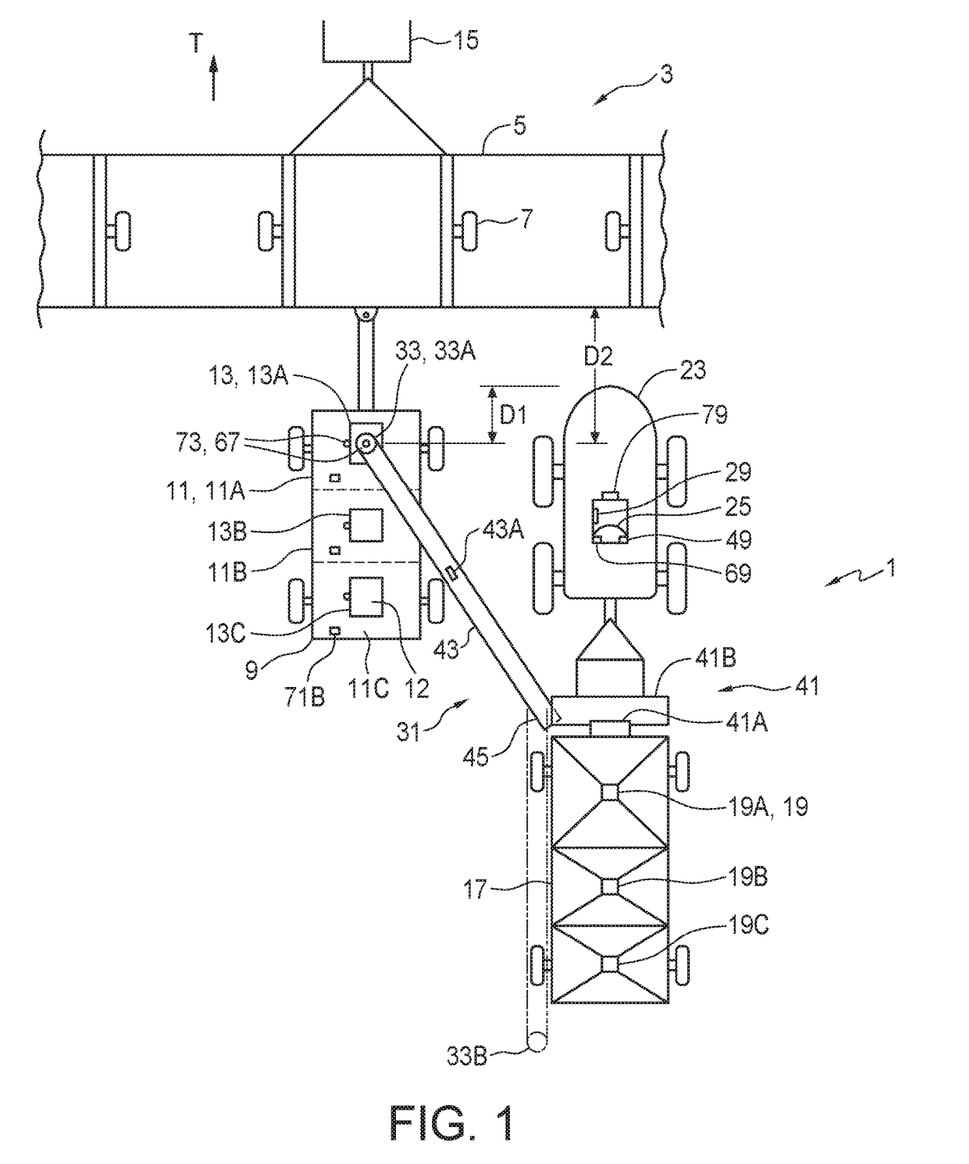

A conveyor system 31 is configured to receive product from each container output port 19 and transfer same to a conveyor discharge 33. The conveyor discharge 33 is movable from a discharge operating position 33A to a discharge transport position 33B. As seen in FIG. 1 when in the discharge operating position 33A the tractor 23 is lateral to the tank cart 9 and the conveyor discharge 33 is located lateral to the operator's station 25. The horizontal distance D1 between a front end of the tractor 23 and the conveyor discharge 33 is less than the horizontal distance between rear side of the furrow opener implement 5 and the first fill opening 13A, such that when the furrow opener implement 5, the tank cart 9, and the container vehicle comprising the tractor 23 and trailer 21 are aligned in the operating travel direction T, and the conveyor discharge 33 is oriented to discharge into the first tank fill opening 13A, the front end of the container vehicle 23 is rearward of the rear side of the implement 5, as schematically illustrated in FIG. 1. In the illustrated apparatus 1 the conveyor discharge 33 is shown forward of the operator's station 25 which facilitates the operator guiding the conveyor discharge 33, but same could be only generally lateral to the operator's station where the dimensions of the tractor 23, furrow opener implement 5 and cart 9 allow.

With this arrangement the product tanks 11 on the cart 9 can be quickly filled saving valuable time during the busy seeding season. The operator of the air seeder 3 simply stops at a convenient location and opens the covers 12 on the fill opening 13 of the product tanks 11. Most conveniently this can be accomplished where the tank fill openings comprise a cover 12 that can be opened remotely by an operator of the air seeder 3 without leaving the tractor 15, but can also be done manually.

The operator of the transport apparatus 1 drives up from behind the position shown in FIG. 1 and moves the conveyor discharge 33 from the transport position 33B to the discharge operating position 33A. The operator of the transport apparatus 1 can move the conveyor discharge 33 laterally with respect to the trailer 17 to align the conveyor discharge 33 laterally and also move the tractor 23 forward or rearward to align a selected one of the fill openings 13 with the conveyor discharge 33. Once the conveyor discharge 33 is aligned above the fill opening 13, the discharge 33 may be moved vertically and lowered into the fill opening 13 to reduce the risk of spillage. For example the conveyor discharge 33 and conveyor system 31 may be moved up and down, or conveyor discharge 33 can comprise an extendable spout 35 with a spout actuator 37 operative to extend and retract the spout 35 and a spout control 39 operative to activate the spout actuator 37.

The illustrated conveyor system 31 comprises a receiving conveyor 41 and a transfer conveyor 43. The receiving conveyor 41 is configured to receive product from each container output port 19 and transfer the received product to the intake end 45 of the transfer conveyor 43 located adjacent to a forward end of the front product container 17A, and the transfer conveyor 43 is operative to transfer the received product to the conveyor discharge 33 located on an outer end of the transfer conveyor 43. In the illustrated apparatus 1 the receiving conveyor 41 comprises a first belt conveyor 41A extending under each output port 19 and a second belt conveyor 41B that receives product from the first conveyor 41A and carries it laterally into the intake 45 of the transfer conveyor 43.

The transfer conveyor 43 is pivotally connected to the trailer 21 at the intake end 45 thereof and is movable from a transport position where the transfer conveyor extends rearward from the intake end thereof beside the product containers 17 and the conveyor discharge 33 is in the discharge transport position 33B, to an operating position where the transfer conveyor 43 extends forward and upward from the intake end 45 thereof.

A conveyor pivot actuator 47 is operative to pivot the transfer conveyor 43 between the transport position and the operating position, and a conveyor control 49 at the operator's station operative to activate the conveyor pivot actuator. In the illustrated apparatus 1 the intake end 45 of the transfer conveyor 43 is connected to the trailer 21 at a pivotal connection, such as a ball and socket connection 51, which allows the transfer conveyor 43 to pivot between the operating position and transport position, and also pivot up and down to raise and lower the conveyor discharge 33.

A laterally extending conveyor support bracket 53 is attached at an outer end thereof to a middle portion of the transfer conveyor 43 and is pivotally attached to the trailer 21 about a vertical bracket pivot axis BPA that is vertically aligned with the ball and socket connection 51. The conveyor support bracket 53 is configured such that the outer end thereof can move laterally with respect to the vertical bracket pivot axis, and a conveyor vertical actuator 57 is operative to move the outer end 53A of the conveyor support bracket 53 up and down and the conveyor control 49 is operative to activate the conveyor vertical actuator 57.

Figure 2:
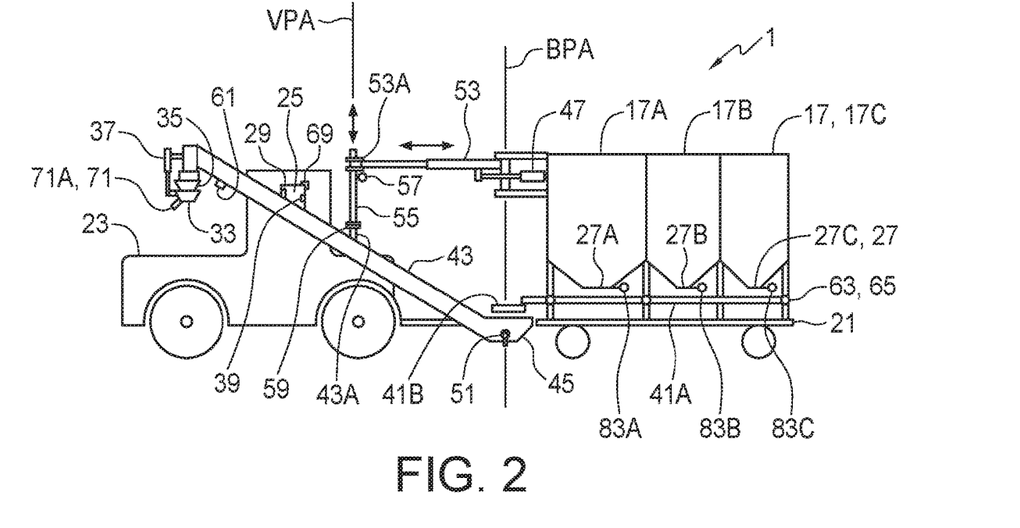
Figure 3:
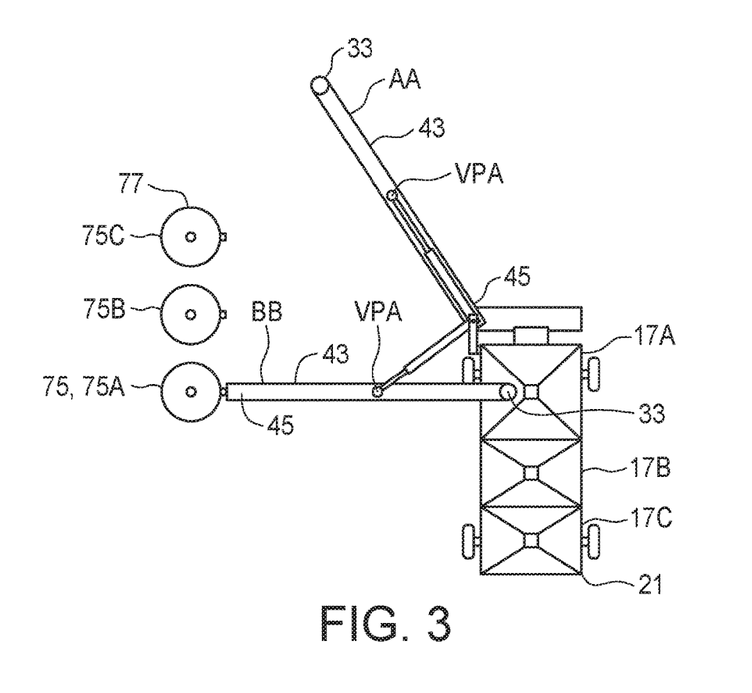

The conveyor support bracket 53 illustrated in FIG. 2 telescopes freely such that the outer end 53A thereof can move laterally with respect to the vertical bracket pivot axis BPA. The outer end 53A of the conveyor support bracket 53 is movably attached to a conveyor mounting member 55 extending down to an attachment lug 43A at a mid-point along the transfer conveyor 43, and a conveyor vertical actuator 57 is operative to move the conveyor mounting member 55 up and down with respect to the outer end 53A of the conveyor support bracket 53. The conveyor control 49 is operative to activate the conveyor vertical actuator 57 as well as the conveyor pivot actuator 47. The telescoping conveyor support bracket 53 moves in and out as the conveyor mounting member 55 moves up and down and the attachment lug 43A moves in an arc centered on the ball and socket connection 51.

For added versatility the conveyor mounting member 55 also provides a vertical pivot axis VPA through swivel assembly 59 at a lower end thereof which is attached to the attachment lug 43A. The intake end 45 of the transfer conveyor 43 is releasably attached to the trailer 21 at the ball and socket connection 51 such that the intake end 45 of the transfer conveyor 43 can be moved to a position lateral to the trailer 21 to move the transfer conveyor 43 from a normal operating position AA to position BB where the conveyor discharge 33 is oriented to discharge into a selected one of the product containers 17, and the intake end 45 is located to receive agricultural product from a storage facility or is accessible for a transport vehicle to refill the product tanks 17 with the various required agricultural products.

Figure 4:
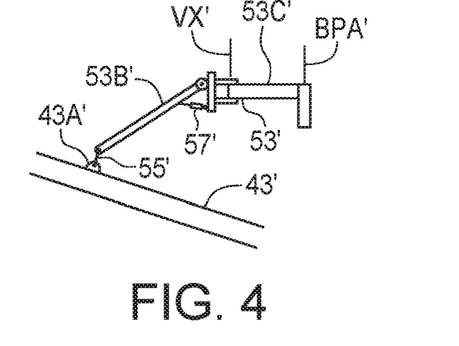
Figure 5:
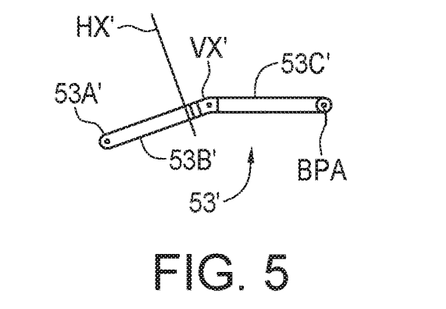

FIGS. 4 and 5 schematically illustrate an alternate arrangement to allow the attachment lug 43' to follow the required arc wherein the outer end 53A' of the conveyor support bracket 53' is attached to the attachment lug 43A' at the middle portion of the transfer conveyor 43 by a flexible conveyor mounting member 55' such as a cable. Here the conveyor support bracket 53' comprises an outer portion 53B' pivotally attached at a vertical pivot axis VX' to an inner portion 53C' which in turn is pivotally attached about the bracket pivot axis BPA. The outer end 53A' of the conveyor support bracket 53' moves laterally with respect to the vertical bracket pivot axis BPA, but added movement is provided by the flexible conveyor mounting member 55'. In the illustrated arrangement the outer portion 53B' is also pivotally connected to the inner portion thereof 53C' about a horizontal pivot axis HX' and the conveyor vertical actuator 57' pivots the outer portion 53B' to raise and lower the transfer conveyor 43', and the conveyor discharge. The conveyor mounting member 55', such as provided by a cable, will also effectively provide the required vertical pivot axis VPA.

To facilitate aligning the conveyor discharge 33 with the tank fill openings 13 a camera 61 can be mounted on the transfer conveyor 43 to send to the operator's station an image looking downward from the conveyor discharge 33. A weighing system 63, such as comprising a plurality of load cells 65, can be provided operative to determine a weight of agricultural products in the product containers 17, or on the entire trailer 21. Keeping track of the weight of the whole trailer while depositing agricultural products into the product containers 17 or removing products from same allows the operator the weight in each product container 17 so long as the products are deposited or removed one at a time. Alternatively the weighing system can be configured to weigh each product container 17 individually.

With the configuration of the container vehicle, here comprising the tractor 23 and trailer 21, and with the accuracy possible with presently available guidance systems using global positioning satellites and the like, the product tanks can be filled "on the go" as the air seeder is moving along a field surface during the seeding operation where the product tanks are not pressurized, or where by other means the fill openings can be open during the seeding operation to allow product to be introduced into the product tanks 11. The transport apparatus 1 can then comprise a guidance system 67 operative to compare a location of the conveyor discharge 33 with a location of a selected one of the tank fill openings 13, and to adjust a path of the tractor 23 to maintain the conveyor discharge 33 at a location where same is oriented to discharge into the selected one of the tank fill openings 13 as the tractor 23, trailer 21, and air seeder 3 move in the operating travel direction T.

A microprocessor controller 69 is connected to the weighing system 63 and is operative to store a weight of the product in each product container 17 and a corresponding indicator of the identity of the product in each product container. With this information and a timer the microprocessor controller 69 can calculate a rate of flow of each product through the corresponding container output port 19. The microprocessor controller 69 is connected to the gate control 29 and is operative to adjust a position of each gate 27 to achieve a desired rate of flow, and is operative to stop the flow of product by closing each gate 27 when a selected weight of product has been dispensed from the corresponding product container 17, or when a level sensor 71 indicates a product tank 11 receiving product from the corresponding product container 17 is full. FIG. 2 schematically illustrates the level sensor 71A attached to the conveyor discharge 33 and configured to send an indication to the microprocessor controller 69 that a product tank is filled to a full volume capacity thereof.

It is contemplated that the microprocessor controller 69 could also stop the flow of product from a container output port 19 by stopping the first belt conveyor 41A so the product piles up on the belt thereof and stops flowing from the output port 19.

Level sensors 71B can also be placed in each of the product tanks 11, and configured to send an indication to the microprocessor controller 69 that the corresponding product tank 11 is filled to a full volume capacity thereof.

The microprocessor controller 69 also stores an indicator of the identity of the product required to be transferred to each product tank 11, and receives product tank information from position sensors 73 indicating that the conveyor discharge 33 is oriented to discharge in a selected one of the product tanks 11. The microprocessor controller 69 is operative to open only the gate 27 corresponding to the product container 17 holding the product required to be transferred to the selected one of the product tanks 11.

In a typical farming operation the farmer will deposit a known stored product weight of each required agricultural product into bins 75 at a storage facility 77 prior to beginning the field seeding operation. In the schematically illustrated seeding operation three products A, B, and C are required to be applied during the seeding operation. The illustrated air seeder cart 9 has three corresponding product tanks 11A, 11B, 11C, the trailer 21 carries three corresponding product containers 17A, 17B, 17C, and the storage facility 77 has three corresponding bins 75A, 75B, 75C.

The microprocessor controller 69 stores a record of the weight of product that has been added to each product container 17 from the storage facility 77 and stores a record of the weight of product that has been removed from each product container 17 and transferred to the product tanks 11 calculates the weight of product remaining in each product container 17.

The microprocessor controller 69 stores a record of a total weight of each product initially in the storage facility 77, and calculates an available weight of each product by adding the weight of each product remaining in the storage facility 77 and the weight of product remaining in each product container 17. Through field mapping and known application rates, which may be constant or variable, the microprocessor controller 69 calculates and stores a record of the required weight of each product required for the seeding operation to be completed by the air seeder, indicates to the farmer when the available weight of any product is less than the required weight of product.

Figure 6:
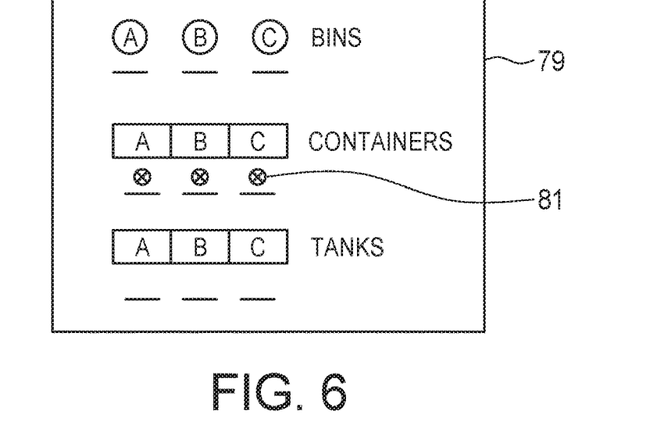

The information stored and calculated is displayed on a screen 79 at the operator's station 25 such as schematically illustrated in FIG. 6. The operator can see indicators of which product is in which product container 17 and in which product tank 11. Manual gate activation switches 81 allow an operator to manually open, close, and adjust the gates 27 to control flow of product from each product container 17.

The present disclosure provides a method of transferring agricultural products from a storage facility 77 to an air seeder 3, where the air seeder 3 comprises a tank cart 9 comprising product tanks 11, and a distribution system for transferring products A, B, C from the corresponding product tanks 17A, 17B, 17C to a field during a field seeding operation. The method comprises, prior to beginning the field seeding operation, depositing a stored product weight of each agricultural product A, B, C into corresponding bins 75A, 75B, 75C at the storage facility 77; transferring a quantity of the agricultural products from the storage facility 77 to corresponding product containers 17A, 17B, 17C and moving the product containers 17 to the air seeder 3.

A microprocessor controller 69 is connected to a weighing system 63 to receive weight information and connected to selectively activate gate actuators 83A, 83B, 83C that are operative to open and close corresponding gates 27A, 27B, 27C; moving the product container 17A to a discharge position and, with the microprocessor controller 69, activating the gate actuator 83A to open the gate 27A on the container 17A such that the product A flows onto a conveyor intake and is transferred by a conveyor system 31 to a conveyor discharge 33 oriented to discharge the product A into the corresponding product tank; 11A; with the weighing system 65, weighing the product A transferred to the product tank 11A and, with the microprocessor controller 69, activating the gate actuator 83A to close the gate 27A upon the microprocessor controller 69 receiving weight information from the weighing system 65 that a selected weight has been transferred from the product container 17A to the product tank 11A, or upon receiving an indication that the product tank 11A is filled to a full capacity thereof. The manual gate activation switches 81 allow the operator to stop the product flow manually as well.

The process is repeated for the other products B and C. The microprocessor controller records the weights of each product A, B, C transferred from the product containers 17 to the corresponding product tanks 11, and records a cumulative weight of each of the products A, B, C transferred from the product containers 17 to the product tanks 11. The weighing system 63 is operative to determine a weight of each product A, B, C transferred from the bins 75 at the storage facility 77 to the product containers 17, and the microprocessor controller 69 records a cumulative weight of each product transferred from the storage facility 77 to the product tank 17 during the field seeding operation and determines a remaining stored product weight and displays same to an operator on the display 79 as the field seeding operation proceeds.

Figure 7:
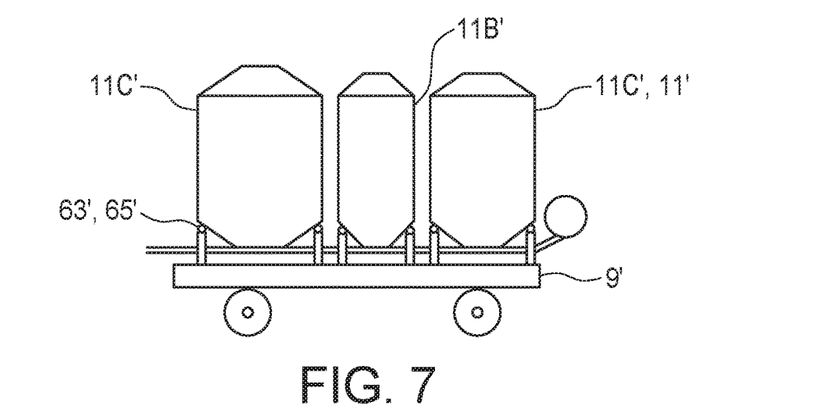

Because of even slight variations in application rates, and the large quantities of agricultural products being applied to large acreages, weighing only the product going into and out of the product containers 17 does not allow a farmer to accurately determine the actual amount of product in the product tanks 11 at any time. Further advantages are provided where the weighing system 63', schematically illustrated on product cart 9' in FIG. 7, comprises load cells 65' configured to sense the weight of each product tank 11' and allow the farmer to determine a weight of the products A, B, C present in the corresponding product tanks 11A', 11B', 11C'.

The method comprises weighing each product tank 11 empty to determine an empty tank weight, weighing the product tank 11 after transferring product to the product tank 11 to determine a filled tank weight, and determining the weight of the product present in the product tank 11 by subtracting the empty weight from the filled weight.

The full capacity weight of each product tank 11 is dependent on density and slope characteristics of the particular product being stored. Determining a full capacity weight for a product in a tank allows the microprocessor controller 69 to close the corresponding gate 27 when the full capacity weight has been transferred instead of relying on bin level sensors.

The full capacity weight of the each product tank 11 can determined by transferring product into the product tank while visually monitoring a level of the product in the first product tank 11 and sending the indication to the microprocessor controller 69 that the product tank 11 is filled to the full capacity thereof. During this process the one viewing the product tank can allow for the amount of product that is on the conveyor system 31 when the gate 27 is closed and that will be transferred into the product tank 11 to empty the conveyor system 31 to prevent cross-contamination of one product with the next product conveyed.

The full capacity weight of each product tank for the particular product being carried in each product tank is recorded in the microprocessor controller 69 and the microprocessor controller is configured to close the corresponding gates 27 when the full capacity weight of product is present in each product tank. The full capacity weight for a product tank will be determined again when the product carried therein is changed.

In order to reduce fuel consumption, soil compaction, and the like it is desirable commonly to carry only the least amount of weight in the product tanks 11 that is required to last until the next filling occasion. To accomplish this the microprocessor controller 69 receives application rate information indicating a rate of application of each product on an agricultural field and calculates a capacity field area that can be covered by each product when each product tank is filled to the full capacity weight thereof. One of the product tanks will have the smallest capacity field area, and the microprocessor controller 69 then calculates a required weight of each of the products that is required to cover the smallest capacity field area, and operates the gates 27 to transfer product to fill the product tank 11 with the smallest capacity field area to the full capacity weight thereof, and to transfer the required weight of each remaining product to the other corresponding product tanks.

Where the rate of application of a variable product changes according to an application rate map, the microprocessor controller 69 receives map information indicating the required variable weight of the variable product, and transfers the required variable weight of the variable product to the corresponding product tank.

It is desirable to finish the seeding operation with all product tanks 11 as near empty as possible without running out of a product before the operation is complete. To facilitate this, the present method can comprise when it is determined that a remaining field area to be seeded to complete the field seeding operation is less than an area that can be seeded with full capacity weights of each product the microprocessor controller 69 can determine a required weight of each product required to seed the remaining field area, and operate the gates 27 to transfer the products into the corresponding product tanks until the weight of the products present in each product tank is substantially equal to the required weight of each product.

Generally product application rates are selected for an optimum rate but in most cases small changes in application rates, especially for a relatively small area at the end of a seeding operation, will not have significant adverse effects. To that end then the method can further comprise monitoring the weight of each product remaining in each product tank 11, and monitoring the remaining field area and adjusting a rate of transferring each product from the product tanks to the field so that the product tanks 11 are substantially empty when the field seeding operation is complete.

While product weight transferred out of the storage facility 77 may or may not be measured, a remaining available product weight of each product, being the product stored in the storage facility 77 and in the product containers 17, can be determined using the weighing system on the cart 9. At any time after a portion of the field seeding operation is completed, the microprocessor controller 69 can calculate the remaining available product weight of each product by subtracting from the stored product weight a cumulative weight of each product transferred from the corresponding first and second product tanks to the field, and adding an additional weight equal to a weight of each of the product that may have been, as is common in typical seeding operations, transferred into the storage facility during the seeding operation. The microprocessor controller 69 can then determine a projected cumulative weight of each product to be transferred from the corresponding product tank to the field to complete the field seeing operation, and indicate to an operator when the projected cumulative weight of a product is greater than the remaining available product weight.

The present disclosure provides information useful to the farmer operator to manage the seeding operation. The time required to change from one product carried in a product tank 11 to a different product carried in that same tank 11 is reduced by placing only the required amount of product in the tank 11 to complete a seeding operation, and further by adjusting the rate to ensure that the tank 11 is substantially empty when the seeding operation is complete and it is desired to place a different product in the tank 11. A running inventory of available weights of each product being used is also available to the farmer.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A transport apparatus for transporting agricultural products to an air seeder, where the air seeder comprises a laterally extending furrow opener implement mounted on wheels for travel in an operating travel direction, and a tank cart towed behind the laterally extending furrow opener implement, the tank cart comprising a first tank with a first tank fill opening on a top of the tank cart at a front of the tank cart, and a second tank with a second tank fill opening on the top of the tank cart rearward of the first tank fill opening, the transport apparatus comprising:

a plurality of product containers mounted on a container vehicle, each product container configured to release product contained therein through a container output port;

a vehicle operator's station at a forward location on the container vehicle;

a gate on each container output port operative to control flow of the product through the container output port, and a gate control operative to control each gate;

a conveyor system configured to receive product from each container output port and transfer same to a conveyor discharge, wherein the conveyor discharge is movable from a discharge transport position to a discharge operating position;

wherein when in the discharge operating position the conveyor discharge is located lateral to the operator's station, and wherein a horizontal distance between a front end of the container vehicle and the conveyor discharge is less than a horizontal distance between a rear side of the laterally extending furrow opener implement and the first tank fill opening, such that when the furrow opener implement, the tank cart, and the container vehicle are aligned in the operating travel direction, and the conveyor discharge is oriented to discharge into the first tank fill opening, the container vehicle is lateral to the tank cart and the front end of the container vehicle is rearward of the rear side of the laterally extending furrow opener implement; and a guidance system operative to compare a location of the conveyor discharge with a location of a selected one of the tank fill openings, and to adjust a path of the container vehicle to maintain the conveyor discharge at a location where same is oriented to discharge into the selected one of the tank fill openings as the container vehicle and air seeder move in the operating travel direction.

2. The apparatus of claim 1 wherein when in the discharge operating position the conveyor discharge is movable laterally with respect to the container vehicle to align the conveyor discharge with a selected one of the first and second tank fill openings.

3. The apparatus of claim 2 wherein when in the discharge operating position the conveyor discharge is movable vertically with respect to the container vehicle.

4. The apparatus of claim 3 wherein the conveyor discharge comprises an extendable spout and comprising a spout actuator operative to extend and retract the spout and a spout control operative to activate the spout actuator.

5. The apparatus of claim 3 wherein the conveyor system comprises:

a receiving conveyor and a transfer conveyor, the receiving conveyor configured to receive product from each container output port and transfer the received product to an intake end of the transfer conveyor located adjacent to a forward end of a front product container, and the transfer conveyor operative to transfer the received product to the conveyor discharge located on an outer end of the transfer conveyor;

wherein the transfer conveyor is pivotally connected to the container vehicle at the intake end thereof and is movable from a transport position where the transfer conveyor extends rearward from the intake end thereof beside the product containers and the conveyor discharge is in the discharge transport position, to an operating position where the transfer conveyor extends forward and upward from the intake end thereof; and a conveyor pivot actuator operative to pivot the transfer conveyor between the transport position and the operating position, and a conveyor control at the operator's station operative to activate the conveyor pivot actuator.

6. The apparatus of claim 5 wherein the intake end of the transfer conveyor is connected to the container vehicle at a pivotal connection, and comprising a laterally extending conveyor support bracket attached at an outer end thereof to a middle portion of the transfer conveyor and pivotally attached to the container vehicle about a substantially vertical bracket pivot axis that is vertically aligned with the pivotal connection.

7. The apparatus of claim 6 wherein the conveyor support bracket is configured such that the outer end thereof can move laterally with respect to the vertical bracket pivot axis, and comprising a conveyor vertical actuator operative to move the outer end of the conveyor support bracket up and down and wherein the conveyor control is operative to activate the conveyor vertical actuator.

8. The apparatus of claim 6 wherein the outer end the conveyor support bracket is movably attached to a conveyor mounting member extending down to the transfer conveyor, and comprising a conveyor vertical actuator operative to move the conveyor mounting member up and down with respect to the outer end of the conveyor support bracket.

9. The apparatus of claim 8 wherein the conveyor mounting member provides a vertical pivot axis and wherein the intake end of the transfer conveyor is releasably attached to the container vehicle at the pivotal connection such that the intake end of the transfer conveyor can be moved to a position lateral to the container vehicle where the conveyor discharge is oriented to discharge into a selected one of the product containers.

10. The apparatus of claim 1 comprising a camera operative to send to the operator's station an image looking downward from the conveyor discharge.

11. The apparatus of claim 1 comprising a weighing system operative to determine a weight of agricultural products in the product containers.

12. The apparatus of claim 1 wherein the tank fill openings comprise a cover that can be opened remotely by an operator of the air seeder.

13. A transport apparatus for transporting agricultural products to an air seeder, where the air seeder comprises a laterally extending furrow opener implement mounted on wheels for travel in an operating travel direction, and a tank cart towed behind the laterally extending furrow opener implement, the tank cart comprising a first tank with a first tank fill opening on a top of the tank cart at a front of the tank cart, and a second tank with a second tank fill opening on the top of the tank cart rearward of the first tank fill opening, the transport apparatus comprising:

a plurality of product containers mounted on a container vehicle, each product container configured to release product contained therein through a container output port;

a vehicle operator's station at a forward location on the container vehicle;

a gate on each container output port operative to control flow of the product through the container output port, and a gate control operative to control each gate;

a conveyor system configured to receive product from each container output port and transfer same to a conveyor discharge, wherein the conveyor discharge is movable from a discharge transport position to a discharge operating position;

wherein when in the discharge operating position the conveyor discharge is located lateral to the operator's station, and wherein a horizontal distance between a front end of the container vehicle and the conveyor discharge is less than a horizontal distance between a rear side of the laterally extending furrow opener implement and the first tank fill opening, such that when the laterally extending furrow opener implement, the tank cart, and the container vehicle are aligned in the operating travel direction, and the conveyor discharge is oriented to discharge into the first tank fill opening, the container vehicle is lateral to the tank cart and the front end of the container vehicle is rearward of the rear side of the laterally extending furrow opener implement; and a weighing system configured to determine a weight of agricultural products in the product containers.

14. The apparatus of claim 13 wherein when in the discharge operating position the conveyor discharge is movable laterally with respect to the container vehicle to align the conveyor discharge with a selected one of the first and second tank fill openings.

15. The apparatus of claim 14 wherein when in the discharge operating position the conveyor discharge is movable vertically with respect to the container vehicle.

16. The apparatus of claim 15 wherein the conveyor discharge comprises an extendable spout and comprising a spout actuator operative to extend and retract the spout and a spout control operative to activate the spout actuator.

17. The apparatus of claim 15 wherein the conveyor system comprises:

a receiving conveyor and a transfer conveyor, the receiving conveyor configured to receive product from each container output port and transfer the received product to an intake end of the transfer conveyor located adjacent to a forward end of a front product container, and the transfer conveyor operative to transfer the received product to the conveyor discharge located on an outer end of the transfer conveyor;

wherein the transfer conveyor is pivotally connected to the container vehicle at the intake end thereof and is movable from a transport position where the transfer conveyor extends rearward from the intake end thereof beside the product containers and the conveyor discharge is in the discharge transport position, to an operating position where the transfer conveyor extends forward and upward from the intake end thereof; and a conveyor pivot actuator operative to pivot the transfer conveyor between the transport position and the operating position, and a conveyor control at the operator's station operative to activate the conveyor pivot actuator.

18. The apparatus of claim 17 wherein the intake end of the transfer conveyor is connected to the container vehicle at a pivotal connection, and comprising a laterally extending conveyor support bracket attached at an outer end thereof to a middle portion of the transfer conveyor and pivotally attached to the container vehicle about a substantially vertical bracket pivot axis that is vertically aligned with the pivotal connection.

19. The apparatus of claim 18 wherein the conveyor support bracket is configured such that the outer end thereof can move laterally with respect to the vertical bracket pivot axis, and comprising a conveyor vertical actuator operative to move the outer end of the conveyor support bracket up and down and wherein the conveyor control is operative to activate the conveyor vertical actuator.

20. The apparatus of claim 18 wherein the outer end the conveyor support bracket is movably attached to a conveyor mounting member extending down to the transfer conveyor, and comprising a conveyor vertical actuator operative to move the conveyor mounting member up and down with respect to the outer end of the conveyor support bracket.

21. The apparatus of claim 20 wherein the conveyor mounting member provides a vertical pivot axis and wherein the intake end of the transfer conveyor is releasably attached to the container vehicle at the pivotal connection such that the intake end of the transfer conveyor can be moved to a position lateral to the container vehicle where the conveyor discharge is oriented to discharge into a selected one of the product containers.

22. The apparatus of claim 13 comprising a camera operative to send to the operator's station an image looking downward from the conveyor discharge.

23. The apparatus of claim 13 wherein the tank fill openings comprise a cover that can be opened remotely by an operator of the air seeder.

24. The apparatus of claim 13 comprising a guidance system operative to compare a location of the conveyor discharge with a location of a selected one of the tank fill openings, and to adjust a path of the container vehicle to maintain the conveyor discharge at a location where same is oriented to discharge into the selected one of the tank fill openings as the container vehicle and air seeder move in the operating travel direction.

* * * * *